June 24, 1947.  E. V. MORLEY  2,422,741

PLAIN BEARING LUBRICATOR

Filed Dec. 26, 1944

INVENTOR.
EARLE V. MORLEY
BY
*Murry, Liddy & Glascum*
ATTORNEYS

Patented June 24, 1947

2,422,741

UNITED STATES PATENT OFFICE 2,422,741

PLAIN BEARING LUBRICATOR

Earle V. Morley, Oakland, Calif.

Application December 26, 1944, Serial No. 569,818

2 Claims. (Cl. 308—36.1)

1

The present invention relates to improvements in a plain bearing lubricator, and it consists of the combinations, constructions and arrangements hereinafter described and claimed.

An object of my invention is to provide a different form of plain bearing lubricator than that shown in my co-pending application, Serial No. 561,937, filed November 4, 1944, now Patent Number 2,418,313 issued April 1, 1947. In my companion case I show two diametrically opposed lubricating channels extending longitudinally of the shaft and I further show another channel that extends diametrically across the end of the shaft. Oil or other lubricating medium is continuously fed to the channels for lubricating the bearing. An oil sealing ring is placed between the body of the device and a cover plate and prevents oil from leaking through the shaft opening provided in the cover plate.

In the present form of the device I show the shaft extending through an opening in the body rather than through an opening in the cover plate. The principal object of the present invention is to provide an oil seal for the shaft opening in the body which may be removed from the body for repair or replacement without the necessity of removing the shaft from the body.

A further object of my invention is to provide a device of the type described which is extremely simple in construction and which is durable and efficient for the purpose intended.

Other objects and advantages will appear in the following specification, and the novel features of the device will be particularly pointed out in the appended claims.

My invention is illustrated in the accompanying drawing forming a part of this application, in which.

While I have shown only the preferred forms of my invention, it should be understood that various changes or modifications may be made within the scope of the appended claims without departing from the spirit and scope of the invention.

2

Figure 1:
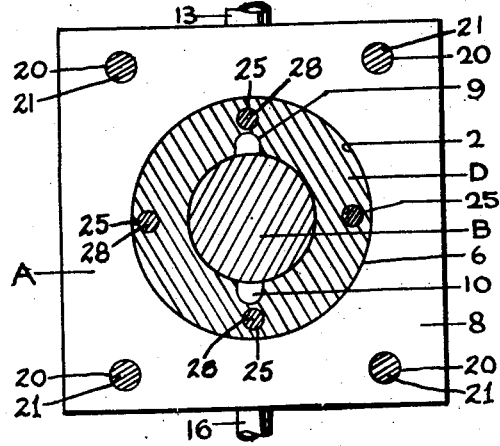
Figure 1 is a front elevation of the body with the cover plate removed and is taken substantially along the line 1—1 of Figure 3.
Figure 3:
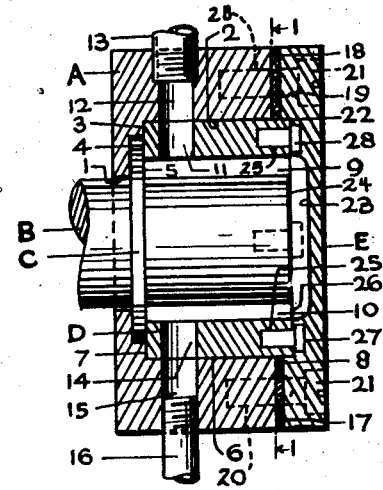
Figure 3 is a longitudinal section through the device, portions being shown in elevations.

In carrying out my invention I provide a body for the bearing indicated generally at A in Figures 1 and 3. The body has an opening 1 for a shaft B. The body also has an enlarged stepped recess 2 of a greater diameter than the opening 1 and concentric with the opening 1. The recess has two shoulders 3 and 4, the shoulder 4 being disposed adjacent to the opening 1 and the shoulder 3 being spaced longitudinally from the shoulder 4. An oil sealing ring C is placed against the shoulder 4 and is designed to encircle the shaft B so as to prevent leakage of oil through the opening 1. The face 5 of the oil seal C lies flush with the shoulder 3.

Figure 4:
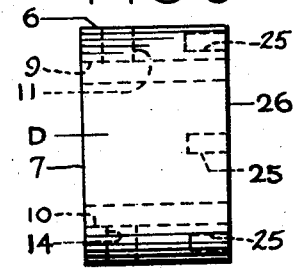
Figure 4 is a side elevation of the fluted bearing.
Figure 5:
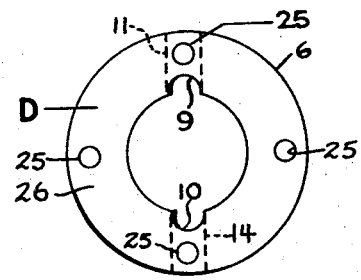
Figure 5 is an end view of Figure 4.

A fluted bearing D, shown in Figures 4 and 5 has an outer diameter 6 that is the same as the diameter of the recess 2. The end 7 of the bearing abuts the shoulder 3 when the bearing is placed in the recess 2. The bearing projects beyond the face 8 of the body A.

Figure 5 shows the bearing provided with two longitudinally extending grooves 9 and 10 that are disposed diametrically opposite each other and extend throughout the length of the bearing. The groove 9 communicates with an inlet opening 11 in the bearing and Figure 3 shows the opening 11 registering with a passage 12, which in turn is threaded to receive an oil inlet pipe 13. The groove 10 communicates with an oil outlet opening 14 in the bearing D and the opening 14 registers with an outlet passage 15, which in turn, is internally threaded for receiving the threaded end of an outlet pipe 16.

A cover plate E has its inner face 17 adapted to bear against a gasket 18 which is placed between the cover E and the face 8 of the body A. The cover E has openings 19 registering with the bores 20 in the body A for receiving cap screws 21. The bores 20 are threaded for receiving the screws.

Figure 2:
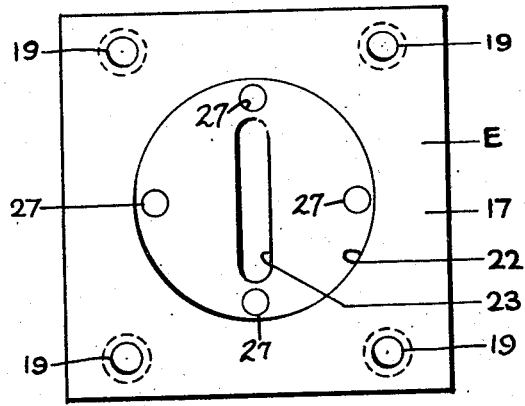
Figure 2 is a plan view of the inner face of the cover plate.

Reference to Figures 2 and 3 shows the inner face 17 of the cover provided with a circular recess 22 for receiving the projecting end of the bearing D. I also provide a groove 23 in the base of the recess, this groove extending diametrically across the end 24 of the shaft B. The ends of the groove 23 communicate with the ends of the longitudinally extending grooves 9 and 10 and this causes the oil to enter the passage 12 from the pipe 13, flow along the groove 9, groove 23 and groove 10 and then flow out through the opening 14, passage 15 and outlet pipe 16.

In order to prevent the bearing D from rotating with the shaft B I provide bores 25 in the outer end 26 of the fluted bearing D. The bores 25 register with recesses 27 in the cover plate which receive the heads of pins 28. The shanks of the pins 28 pass on into the bores 25 for holding the bearing from rotating when the cover plate is in place.

From the foregoing description of the various parts of the device, the operation thereof may be readily understood.

The shaft B is supported by the bearing D and may be used for any purpose desired. The oil will flow to and from the plain bearing in the manner already stated. The lubricating medium may be pumped, or can flow by gravity or a vacuum can be used for moving the medium through the plain bearing continuously. When it is desired to gain access to the oil seal ring C to remove it the cover plate E is removed and then the bearing is removed. This gives access to the sealing ring which may be removed from the recess 2 without the necessity of removing the shaft from the body. The sealing ring can be repaired or a new one substituted and then the bearing D and cover plate E can be moved back into place. The pin-bolts 28 provide a simple means for preventing the rotation of the bushing D. The pin-bolts may have a sliding, pushing or driving fit in their bores 25. The pin-bolts cannot work loose since their heads are received in the recesses 27.

The inlet pipe 13 has a slightly larger inner diameter than the outlet pipe 16, thus insuring a flooding of the channels or grooves 9, 10 and 23, before the lubricant is released through the outlet pipe 16.

Figure 6:
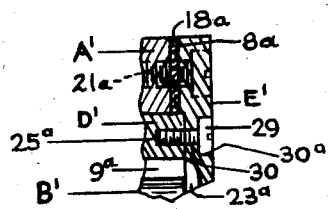
Figure 6 is a modified form of the device.

In Figure 6, I show a slightly modified form of the invention where cap screws 29 take the place of the pin-bolts 28. The bores 25a in the bushing D' are tapped and the cover plate E' has openings 30 for receiving the shanks of the cap screws, the openings communicating with recesses 30a that receive the cap screw heads. The cap screws prevent the rotation of the bushing in the body A' in the same manner as the pin bolts 28 hold the bushing D against rotation. In all other respects the form of the device shown in Figure 6 is the same as the form shown in Figures 1 to 5 inclusive and no further description need be given. Corresponding parts will be given similar reference numerals except in the form shown in Figure 6, the letter "a" will be added after a numeral which is similar to the one in the preferred form.

I claim:

1. A plain bearing lubricator comprising a body having an opening therein for rotatably receiving a shaft and an enlarged cylindrical recess axially aligned with the opening and communicating therewith, an oil sealing ring placed in the recess and around the shaft for preventing a lubricant from escaping through the opening, a bushing receivable in the recess and having one end contacting with the oil seal ring, said bushing having longitudinally extending grooves on its inner surface for conveying a lubricant in contact with the shaft, a cover plate for the bushing, said plate having a groove therein placing the bushing grooves in communication with each other, the cover plate groove causing the lubricant to contact the end of the shaft, said body and bushing having aligned inlets communicating with one of the bushing grooves, said body and bushing having aligned outlets communicating with the other bushing groove, whereby a continuous flow of lubricant along the grooves is assured, and means for holding the bushing from rotating.

2. A plain bearing lubricator comprising a body having an opening therein for rotatably receiving a shaft and an enlarged stepped cylindrical recess axially aligned with the opening and communicating therewith, an oil sealing ring encircling the shaft and receivable in the recess and bearing against one of the steps for preventing a lubricant from passing through the opening, a bushing receivable in the recess and having one end contacting with the oil seal ring and with the other recess step, said bushing having longitudinally extending and diametrically opposed grooves on its inner surface for conveying a lubricant in contact with the shaft, a cover plate for the recess and bushing and having a groove therein placing the bushing grooves in communication with each other, the cover plate groove causing the lubricant to contact the shaft end, pin-bolts having their shanks received in bores provided with the bushing and their heads received in recesses provided in the cover plate for interconnecting the bushing and cover plate for preventing rotation of the bushing in the body, said body and bushing having aligned inlets communicating with one of the bushing grooves, the body and bushing also having aligned outlets communicating with the other bushing groove, whereby a continuous flow of lubricant along the grooves is assured.

EARLE V. MORLEY.

REFERENCES CITED

The following references are of record in the file of this patent:

UNITED STATES PATENTS

| Number | Name | Date |
|---|---|---|
| 1,745,425 | Johnson | Feb. 4, 1930 |
| 2,212,223 | Barnes | Aug. 20, 1940 |
| 1,376,043 | Sherwood | Apr. 26, 1921 |
| 525,338 | Corneluisser | Sept. 4, 1894 |
| 738,513 | Baker | Sept. 8, 1903 |
| 2,337,403 | Myers et al. | Dec. 21, 1943 |